(12) United States Patent
Klein et al.

(10) Patent No.: US 6,795,427 B1
(45) Date of Patent: Sep. 21, 2004

(54) ESTIMATION OF TRANSMISSION CHANNELS IN COMMUNICATION SYSTEMS FOR WIRELESS TELECOMMUNICATION

(75) Inventors: Anja Klein, Berlin (DE); Markus Nasshan, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,256

(22) PCT Filed: Sep. 30, 1998

(86) PCT No.: PCT/DE98/02894

§ 371 (c)(1),
(2), (4) Date: Apr. 26, 2000

(87) PCT Pub. No.: WO99/22454

PCT Pub. Date: May 6, 1999

(30) Foreign Application Priority Data

Oct. 27, 1997 (DE) .......................................... 197 47 369

(51) Int. Cl.⁷ .............................................. H04B 7/212
(52) U.S. Cl. ........................ 370/347; 370/468; 375/231
(58) Field of Search ................................ 370/337, 321, 370/342, 347, 503, 320, 336, 345, 468, 498, 332, 333, 335, 441; 375/200, 206, 229, 231, 232

(56) References Cited

U.S. PATENT DOCUMENTS

| | | | |
|---|---|---|---|
| 5,303,226 A | | 4/1994 | Okanoue et al. |
| 5,479,444 A | | 12/1995 | Malkamaki et al. |
| 5,754,538 A | * | 5/1998 | Kumar et al. ............... 370/347 |
| 5,970,060 A | * | 10/1999 | Baier et al. .................. 370/342 |
| 6,226,515 B1 | * | 5/2001 | Pauli et al. .................. 455/426 |
| 6,370,185 B1 | * | 4/2002 | Schmutz et al. ............. 375/214 |
| 6,430,413 B1 | * | 8/2002 | Wedi et al. .................. 455/442 |

FOREIGN PATENT DOCUMENTS

| | | |
|---|---|---|
| DE | 42 33 222 A1 | 4/1994 |
| WO | WO 93/21719 | 10/1993 |

OTHER PUBLICATIONS

IEEE Communications Magazine, Jan. 1995, David D. Falconer et al., Time Division Multiple Access Methods for Wireless Personal Communications, pp. 50–57.

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

Telcom Report 16 (1993), No. 1, J. H. Koch: "Digitaler Komfort für schnurlose Telekommunikation—DECT–Standard eröffmet neue Nutzungsgebiete", pp. 26–27.

Tec 2/93—Das technische Magazine von Ascom "Wege zur universellen mobilen Telekommunikation", pp. 35 to 42.

Philips Telecommunication Review, R. J. Mulder, "DECT, a universal cordless access system", pp. 68–73.

(List continued on next page.)

Primary Examiner—Chi Pham
Assistant Examiner—Alexander O. Boakye
(74) Attorney, Agent, or Firm—Bell, Boyd & Lloyd LLC

(57) ABSTRACT

The correlations of different channel impulse responses are used to improve, simplify and optimize the assessment of wire-free transmission channels in telecommunications systems. In particular, the different channel and pulse responses are correlated by identifying a similarity between the different responses and driving a mean channel impulse response from the different channel impulse responses when they are identified as similar.

85 Claims, 14 Drawing Sheets

OTHER PUBLICATIONS

Informatik Spektrum 14, Jun. 1991, No. 3, Berlin, A Mann, "Der GSM–Standard—Grundlage für dugutake europäische Mobilfunknetze", pp. 137–152.

ETSI—Publication, Oct. 1992, ETS 300175 1 . . . 9, Part 1: Overview, pp. 1–30; Part 2: Physical layer, pp. 1–039; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

Nachrichtentech, Elektronik, Berlin 45, (1995), P.Jung et al., Konzept eines CDMA–Mobilfunksystems mit gemeinsamer Detektion für die dritte Mobilfunkgeneration, Tiel 2, pp. 24–27.

Nachrichtentech, Elektronik, Berlin 41, (1991), Baier et al., "CDMA—ein günstiges Vielfachzugriffs– verfahren für frequenzselektive und zeitvariante Mobilfunkkanäle", pp. 223–227.

IEICE Transactions on Fundamentals of Electronics, Communications and Computer Sciences, vol. E79–A, No. 12, (1996), Baier, et al., "CDMA Myths and Realities Revisited", pp. 1930–1937.

IEEE Personal Communications, (1995), Andermo et al., "An CDMA–Based Radio Access Design for UMTS", pp. 48–53.

R. Steele, "Mobile Radio Communications", Pentech Press, (1992) Chapter 8: The Pan–European digital Cellular Mobile Radio syste, Telekom praxis, May 1995, Baier, "Spread–Spectrum–Technik and und CDMA—eine ursprünglich militärische Technik erobert den zivilen Bereich", pp. 9–14.

IEEE Personal Communications, (1995), Urie, et al., "An Advanced TDMA Mobile Access Systems for UMTS", pp 38–47.

* cited by examiner

ESTIMATION OF TRANSMISSION CHANNELS IN COMMUNICATION SYSTEMS FOR WIRELESS TELECOMMUNICATION

BACKGROUND OF THE INVENTION

Transmitting and receiving appliances (transmitters and receivers) are used in message systems having a message transmission path between a message source and a message sink for message processing and transmission, for those appliances in which 1) the message processing and message transmission can take place in a preferred transmission direction (simplex operation) or in both transmission directions (duplex operation);
2) the message processing is analog or digital; or
3) the message transmission via the long-distance transmission path is wire-based or is carried out without wires (for example by radio transmission) on the basis of various message transmission methods FDMA (Frequency Division Multiple Access), TDMA (Time Division Multiple Access) and/or CDMA (Code Division Multiple Access)—for example in accordance with radio standards such as DECT, GSM, WACS or PACS, IS-54, IS-95, PHS, PDC etc. [see IEEE Communications Magazine, January 1995, pages 50 to 57; D. D. Falconer et al.: "Time Division Multiple Access Methods for Wireless Personal Communications"].

"Message" is a generic term that covers both the content (information) and the physical representation (signal). Despite a message having the same content—(i.e., the same information different signal forms may occur. Thus, for example, a message relating to one item may be transmitted (1) in the form of a picture;
(2) as the spoken word;
(3) as the written word;
(4) as an encrypted word or picture.

The transmission types in situation (1) to (3) are, in this case, normally characterized by continuous (analog) signals, while the transmission type in (4) normally consists of discontinuous signals (for example pulses, digital signals).

Based on this general definition of a message system, the invention relates to a method for assessing transmission channels in telecommunications systems using wire-free telecommunication, as claimed in the precharacterizing clauses of patent claims 1, 6, 9 and 11, and to transceiver for assessing transmission channels in telecommunications systems using wireless telecommunication, as claimed in the precharacterizing clauses of patent claims 22, 27, 30 and 32.

Telecommunications systems using wireless telecommunication, as are presented and described in the following documents (1): Nachrichtentechnik Elektronik [Electronic information technology], Berlin 45, 1995, Issue 1, pages 10 to 14 and Issue 2, pages 24 to 27; P. Jung, B. Steiner: "Konzept eines CDMA-Mobilfunksystems mit gemeinsamer Detektion für die dritte Mobilfunkgeneration" [Concept of a CDMA mobile radio system with joint detection for the third mobile radio generation]; (2): Nachrichtentechnik Elektronik [Electronic information technology], Berlin 41, 1991, Issue 6, pages 223 to 227 and page 234; P. W. Baier, P. Jung, A. Klein: "CDMA—ein günstiges Vielfachzugriffsverfahren für frequenzselektive und zeitvariante Mobilfunkkanäle" [CDMA—a useful multiple-access method for frequency-selective and time-variant mobile radio channels]; (3): IEICE Transactions on Fundamentals of Electronics, Communications and Computer Sciences, Vol. E79-A, No. 12, December 1996, pages 1930 to 1937; P. W. Baier, P. Jung: "CDMA Myths and Realities Revisited"; (4): IEEE Personal Communications, February 1995, pages 38 to 47; A. Urie, M. Streeton, C. Mourot: "An Advanced TDMA Mobile Access System for UMTS"; (5): telekom praxis, May 1995, pages 9 to 14; P. W. Baier: "Spread-Spectrum-Technik and CDMA—eine ursprünglich militärische Technik erobert den zivilen Bereich" [Spread spectrum technology and CMDA—an originally military technology takes over the civil area]; (6): IEEE Personal Communications, February 1995, pages 48 to 53; P. G. Andermo, L. M. Ewerbring: "A CDMA-Based Radio Access Design for UMTS"; (7): ITG Fachberichte [ITG Specialist Reports] 124 (1993), Berlin, Offenbach: VDE Verlag ISBN 3-8007-1965-7, pages 67 to 75; Dr. T. Zimmermann, Siemens A G: "Anwendung von CDMA in der Mobilkommunikation" [Use of CDMA for mobile communication]; (8): telecom report 16, (1993), Issue 1, pages 38 to 41; Dr. T. Ketseoglou, Siemens A G and Dr. T. Zimmermann, Siemens A G: "Effizienter Teilnehmerzugriff für die 3. Generation der Mobilkommunikation—Vielfachzugriffsverfahren CDMA macht Luftschnittstelle flexibler" [Efficient subscriber access for 3rd generation mobile communication—multiple-access methods CDMA makes the radio interface more flexible], are referred to as the future third-generation radio telecommunications scenario, based on the prospect of a Universal Mobile Telecommunications System (UMTS).

The second generation radio telecommunications scenario is currently governed, in the microcell and macrocell area, by the GSM-specific radio telecommunications system based on the FDMA/TDMA/FDD transmission principle (Frequency Division Duplex) [Global System for Mobile Communication; vgl. (1): Informatik Spectrum [Information technology spectrum] 14, (1991) June, No. 3, Berlin, DE; A. Mann: "Der GSM-Standard—Grundlage für digitale europäische Mobilfunknetze" [The GSM Standard—the basis for digital European mobile radio networks], pages 137 to 152; (2): R. Steele: Mobile Radio Communications, Pentech Press, 1992 (Reprint 1994), Chapter 8: The Pan-European Digital Cellular Mobile Radio System—known as GSM, pages 677 ff.; (3): telekom praxis April 1993, P. Smolka: "GSM-Funkschnittstelle—Elemente und Funktionen" [GSM radio interface—elements and functions], pages 17 and 24] and, in the picocell area, by the DECT telecommunications system based on the FDMA/TDMA/TDD transmission principle (Time Division Duplex) [Digital Enhanced (previously: European) Cordless Telecommunication; see (1): Nachrichtentechnik Elektronik [Electronics information technology] 42 (1992) January/February No. 1, Berlin, DE; U. Pilger "Struktur des DECT-Standards" [Structure of the DECT Standard], pages 23 to 29 in conjunction with ETSI Publication ETS 300175-1 . . . 9, October 1992; (2); telecom report 16 (1993), No. 1, J. H. Koch: "Digitaler Komfort für schnurlose Telekommunikation—DECT-Standard eröffnet neue Nutzungsgebiete" [Digital convenience for cordless communications—the DECT Standard opens up new fields of use], pages 26 and 27; (3): tec 2/93—The technical magazine from Ascom "Wege zur universellen mobilen Telekommunikation" [Approaches to universal mobile telecommunications], pages 35 to 42; (4): Philips Telecommunication Review Vol. 49, No. 3, September 1991, R. J. Mulder: "DECT, a universal cordless access system"; (5): WO 93/21719 (FIGS. 1 to 3 with associated description)].

FIG. 1 shows the TCH multiframe, TDMA frame and TDMA timeslot structure for the GSM mobile radio concept which is known for user data transmission on the traffic channel (Traffic Channel TCH) from the documents "(1): Informatik Spectrum [Information technology spectrum] 14 (1991) June, No. 3, Berlin, DE; A. Mann: "Der GSM-Standard—Grundlage für digitale europäische Mobilfunknetze" [The GSM Standard—The basis for digital European modile radio networks], pages 137 to 152; (2): R. Steele: Mobile Radio Communications, Pentech Press, 1992 (Reprint 1994), Chapter 8: The Pan-European Digital Cellular Mobile Radio System—known as GSM, pages 677 ff.; (3): telekom praxis April 1993, P. Smolka: "GSM-Funkschnittstelle—Elemente und Funktionen" [GSM radio interface—elements and functions], pages 17 and 24", in which the data embedded in the described structure are transmitted using the FDD principle in the uplink path or uplink direction (uplink; "mobile station→base station" transmission) in the frequency band between 890 MHz and 915 MHz and in the downlink path or downlink direction (downlink; "base station→mobile station" transmission) in the frequency band between 935 MHz and 960 MHz.

FIG. 2 shows the multiframe, TDMA frame and TDMA timeslot structure of the DECT mobile radio concept which is known from the document "Nachrichtentechnik Elektronik [Electronics information technology] 42 (1992) January/February, No. 1, Berlin, DE; U. Pilger "Struktur des DECT-Standards" [Structure of the DECT Standard], pages 23 to 29", in which the data embedded in the described structure are transmitted, using the TDD principle, in the timeslots 0 . . . 11 in the downlink path or downlink direction (downlink; "base station→mobile station" transmission), and in the timeslots 12 . . . 23 in the uplink path or uplink direction (uplink; "mobile station→base station" transmission).

Based on the document Nachrichtentechnik Elektronik [Electronics information technology], Berlin 45, 1995, Issue 1, pages 10 to 14 and Issue 2, pages 24 to 27; P. Jung, B. Steiner: "Konzept eines CDMA-Mobilfunksystems mit gemeinsamer Detektion für die dritte Mobilfunkgeneration" [Concept of a third mobile radio generation CDMA mobile radio system with joint detection], FIG. 3 shows a possible FDMA/TDMA/CDMA multiple access for the uplink path (uplink; "mobile station→base station" transmission direction) and downlink path (uplink; "base station→mobile station" transmission direction) of a telecommunications system with CDMA, FDMA and TDMA multiple-access components, for example a Joint Detection CMDA mobile ratio concept, in which—as in the GSM system (see FIG. 1)—the data are transmitted using the FDD principle in the uplink path or uplink direction (uplink; "mobile station→base station" transmission) and in the downlink path or downlink direction (downlink; "base station→mobile station" transmission) in different frequency bands.

The number of simultaneously active subscribersk in one timeslot is, for example, K=8.

Based on the illustration of multiple access in FIG. 3, FIG. 4 shows the timeslot structure (burst structure) for the uplink path (uplink; "mobile part→base station" transmission direction) for the Joint Detection CDMA mobile radio concept, which is known from the document Nachrichtentechnik Elektronik [Electronics information technology], Berlin 45, 1995, Issue 1, pages 10 to 14 and Issue 2, pages 24 to 27; P. Jung, B. Steiner: "Konzept eines CMDA-Mobilfunk-systems mit gemeinsamer Detektion für die dritte Mobilfunkgeneration" [Concept of a third-generation CDMA mobile radio system with joint detection] and is illustrated, in particular, in FIG. 5 of that document.

The 24 user data block data symbols shown in FIG. 4 are spread using a subscriber-specific spread code with a spreading factor of Q=14, so that each data symbol 14 contains data elements in the form of "chips". Based on a GSM radio scenario with, for example, two radio cells and base stations (Base Transceiver Station) arranged in them, in which case a first base station BTS1 (transmitter/receiver; transceiver) "illuminates" a first radio cell FZ1 and a second base station BTS2 (transmitter/receiver; transceiver) "illuminates" a second radio cell FZ2, omnidirectionally, FIG. 5 shows an FDMA/TDMA/CDMA radio scenario in which the base stations BTS1, BTS2 are connected or can be connected via a radio interface, which is designed for the FDMA/TDMA/CDMA radio scenario, to a number of mobile stations MS1 . . . MS5 (transmitters/receivers; transceiver) located in the radio cells FZ1, FZ2, via wire-free unidirectional or bidirectional—uplink direction UL and/or downlink direction DL—telecommunication on appropriate transmission channels TRC. The base stations BTS1, BTS2 are connected in a known manner (see the GSM telecommunications system) to a base station controller BSC (Base Station Controller), which carries out the frequency management and switching functions while controlling the base stations. For its part, the base station controller BSC is connected via a mobile switching center MSC (Mobile Switching Center) to the higher-level telecommunications network, for example to the PSTN (Public Switched Telecommunications Network). The mobile switching center MSC is the management center for the illustrated telecommunications system. It carries out all the call management and, using associated registers (not illustrated), the authentication of the telecommunications subscribers as well as position monitoring in the network.

FIG. 6 shows the fundamental layout of the base station BTS1, BTS2, which is in the form of a transmitter/receiver response transceiver, while FIG. 7 shows the fundamental layout of the mobile station MT1 . . . MT5, which is likewise in the form of a transmitter/receiver response transceiver. The base station BTS1, BTS2 carries out the transmission and reception of radio messages from and to the mobile station MTS1 . . . MTS5, while the mobile station MT1 . . . MT5 carries out the transmission and reception of radio messages from and to the base station BTS1, BTS2. For this purpose, the base station has a transmitting antenna SAN and a receiving antenna EAN, while the mobile station MT1 . . . MT5 has one antenna ANT, which can be controlled by an antenna switch AU and is used jointly for transmission and reception. In the up-link direction (reception path), the base station BTS1, BTS2 receives, for example, via the receiving antenna EAN at least one radio message FN with an FDMA/TDMA/CDMA component from at least one of the mobile stations MT1 . . . MT5, while, in the downlink direction (reception path), the mobile station MT1 . . . MT5 receives, for example, at least one radio message FN with an FDMA/TDMA/CDMA component from at least one base station BTS1, BTS2, via the joint antenna ANT. The radio message FN in this case comprises, a broadband-spread carrier signal with modulated information composed of data symbols.

The received carrier signal is filtered and mixed down to an intermediate frequency in a radio receiving device FEE, and this intermediate frequency is, for its part, then sampled and quantized. After analog/digital conversion, the signal (which has been subject to distortion from multipath propagation on the radio path) is fed to an equalizer EQL, which compensates for the majority of the distortion keyword: synchronization).

A channel assessor KS then attempts to assess the transmission characteristics of the transmission channel TRC on which the radio message FN was transmitted. The transmission characteristics of the channel are in this case produced in the time domain by means of the channel impulse response. In order that the channel impulse response can be assessed, the radio message FN is assigned or allocated, at the transmission end (in the present case by the mobile station MS1 . . . MS5 or the base station BTS1, BTS2), specific additional information, which is constructed as a training information sequence and is in the form of a so-called midamble.

A joint data detector DD, which follows this and is used for all the received signals, is then used to remove the distortion from and to separate the individual mobile-station-specific signal elements contained in the common signal in a known manner. After distortion removal and separation, the data symbols, which were previously present, are converted into binary data in a symbol-to-data converter SDW After this, a demodulator DMOD is used to obtain the original bit stream from the intermediate frequency before, the individual timeslots are assigned to the correct logical channels in a demutiplex DMUX, and thus to the various mobile stations as well.

The received bit sequence is decoded channel-by-channel in a channel codec KC. Depending on the channel, the bit information is assigned to the control and signaling timeslot or to a voice timeslot and, in the case of the base station (FIG. 6), the control and signaling data and the voice data are jointly passed to an interface SS, which is responsible for signaling and voice coding/decoding (voice codec) for transmission to the base station controller BSC, while, in the case of the mobile station (FIG. 7), the control and signaling data are passed to a control and signaling unit STSE, which is responsible for all the signaling and control in the mobile station, and the voice data are passed to a voice codec SPC, which is designed for voice inputting and outputting.

The voice data are in a predetermined data stream (e.g., 64 kbit/s stream in the network direction or 13 kbit/s stream in the network direction) in the voice codec of the interface SS in the base station BTS1, BTS2.

All the control for the base station BTS1, BTS2 is carried out in a control unit STE.

In the downlink direction (transmission path), the base station BTS1, BTS2 sends, for example, at least one radio message FN with an FDMA/TDMA/CDMA component via the transmitting antenna SAN to at least one of the mobile stations MT1 . . . MT5 while, in the uplink direction (transmission path), the mobile station MS1 . . . MS5 sends, for example, at least one radio message FN with an FDMA/TDMA/CDMA component, via the common antenna ANT to at least one base station BTS1, BTS2.

The transmission path starts in the base station BTS1, BTS2 in FIG. 6 by control and signaling data received in the channel codec KC via the interface SS from the base station controller BSC, as well as voice data being assigned to a control and signaling timeslot or a voice timeslot, with these timeslots being coded channel-by-channel into a bit sequence.

The transmission path starts in the mobile station MS1 . . . MS5 in FIG. 7 by voice data (received in the channel codec KC from the voice codec SPC) and control and signaling data (received from the control and signaling unit STSE) being assigned to a control and signaling timeslot or a voice timeslot, and these timeslots are coded channel-by-channel into a bit sequence.

The bit sequence obtained in the base station BTS1, BTS2 and in the mobile station MS1 . . . MS5 is in each case converted into data symbols in a data-to-symbol converter DSW. Following this, the data symbols are in each case spread in a spreading device SPE using a respective subscriber-specific code. The burst generator BG comprises a burst former BZS and a multiplexer MUX, and, after the previous step, the burst former BZS is in each case used to add a training information sequence, in the form of a midamble for channel assessment, to the spread data symbols, and the burst information obtained in this way is in each case placed in the correct timeslot in the multiplexer MUX. Finally, the burst that has been obtained is in each case radio-frequency modulated and digital/analog converted in a modulator MOD, before the signal obtained in this way is transmitted as a radio message FN, via a radio transmitting device FSE, to the transmitting antenna SAN or to the common antenna ANT.

Telecommunications systems using wire-free telecommunication are subject, in the same way as, for example, the mobile radio system illustrated in FIG. 5, to the known problem (see: documents (1): Nachrichtentechnik Elektronik [Electronic information technology], Berlin 45, 1995, Issue 1, pages 10 to 14 and Issue 2, pages 24 to 27; P. Jung, B. Steiner: "Konzept eines CMDA-Mobilfunksystems mit gemeinsamer Detektion f″r die dritte Mobilfunkgeneration" [Concept of a third generation CDMA mobile radio system with joint detection]; (2): Nachrichtentechnik Elektronik [Electronic information technology], Berlin 41, 1991, Issue 6, pages 223 to 227 and page 234; P. W. Baier, P. Jung, A. Klein: "CMDA—ein günstiges Vielfachzugriffsverfahren f ür frequenzselektive und zeitvariante Mobilfunkkanäle" [CMDA—a useful multiple-access method for frequency-selective and time-variant mobile radio channels]; (3): IEICE Transactions on Fundamentals of Electronics, Communications and Computer Sciences, Vol. E79-A, No. 12, December 1996, pages 1930 to 1937; P. W. Baier, P. Jung: "CMDA Myths and Realities Revisited"; (4): IEEE Personal Communications, February 1995, pages 38 to 47; A. Urie, M. Streeton, C. Mourot: "An Advanced TDMA Mobile Access System for UMTS"; (5): telekom praxis, May 1995, pages 9 to 14; P. W. Baier: "Spread-Spectrum-Technik und CMDA—eine ursprünglich militärische Technik erobert den zivilen Bereich" [Spread spectrum technology and CDMA—an originally military technology takes over the civil area]; (6): IEEE Personal Communications, February 1995, pages 48 to 53; P. G. Andermo, L. M. Ewerbring: "A CDMA-Based Radio Access Design for UMTS"; (7): ITG Fachberichte [ITG Specialist Reports] 124 (1993), Berlin, Offenbach: VDE Verlag ISBN 3-8007-1965-7, pages 67 to 75; Dr. T. Zimmermann, Siemens A G: "Anwendung von CDMA in der Mobilkommunikation" [Use of CMDA for mobile communication]; (8): telecom report 16, (1993), Issue 1, pages 38 to 41; Dr. T. Ketseoglou, Siemens A G and Dr. T. Zimmermann, Siemens A G: "Effizienter Teilnehmerzugriff für die 3. Generation der Mobilkommunikation— Vielfachzugriffsverfahren CMDA macht Luftschnittstelle flexibler" [Efficient subscriber access for 3rd generation mobile communications—CDMA multiple-access method makes the radio interface more flexible]), that the transmission characteristics of the transmission path, of the transmission channel and of the mobile radio channel vary with time. In the time domain, the transmission characteristics of the mobile radio channel are characterized by the channel impulse response. Particularly in TDMA-based mobile radio systems, attempts are therefore made in a known manner to assess the channel impulse response of the mobile radio channel. This is done by inserting training sequences or test signals, so-called midambles, in the respective message to be transmitted (i.e., the burst in the TDMA-based telecommunications systems). The channel impulse response of the mobile radio channel can then be determined using the received signal, which originates from the training sequence or the test signals.

SUMMARY OF THE INVENTION

The object on which the invention is based is to improve, to simplify and to optimize the assessment of wireless transmission channels in telecommunications systems.

This and other objects are achieved by an aspect of the present invention including the method for assessment of transmission channels in telecommunications systems using wire-free telecommunication. A first receiver receives a first message, the first message being transmitted by a first transmitter and at least one further message is received that is transmitted by the first transmitter or a further transmitter. The at least one further message is transmitted in a same direction of transmission as the first message. The transmission channel is then assessed based on the first message and the at least one further message.

According to a further aspect of the present invention, a method includes assigning messages to timeslots and assessing channel impulse responses for the timeslots in the messages. Included in the method is assessing a first channel impulse response and a second channel impulse response. A sufficient similarity is identified between the first channel impulse response and the second channel impulse response when a difference by which the first channel impulse response differs from the second channel impulse response is less than a predetermined limit value. A mean channel impulse response is then formed from the first channel impulse response and a second channel impulse response when the impulse responses are identified as being sufficiently similar.

According to yet another aspect of the present invention, a transmitter/receiver for assessing transmission channels is provided having a channel assessment device. The channel assessment device is configured such that when the transmitter/receiver receives a first message transmitted by an opposing station at least one further message which is transmitted by the opposing station or a further opposing station in the same transmission direction as the transmitter receiver allows the channel assessment device to assess the transmission channel based on the first message and the at least one further message.

Furthermore, based on the transceiver defined in the precharacterizing clause of patent claims 22, 27, 30 and 32, the object is achieved by the features specified in the characterizing part of patent claims 22, 27, 30 and 32.

The idea on which the invention is based is essentially to use correlations of different channel impulse responses. This can be achieved by (i) a telecommunications subscriber [for example, according to FIG. 5, a system-internal subscriber at the mobile station MS1 . . . MS5 or another system-internal subscriber at the mobile station MS1 . . . MS5 (internal link) or a system-external subscriber in the higher-level PST network (external link)] receives the messages intended for him (in the case of TDMA-based telecommunications systems, a subscriber to whom, for example, the timeslot #n of a TDMA frame is assigned) and also uses messages which are intended for other subscribers that are transmitted in the same transmission direction (in the case of TDMA-based telecommunications systems, another subscriber to whom, for example, the timeslot #n−1 in. This allows a considerable improvement to be achieved in the bit error rate (BER or link level performance), which is a function of the bit energy to noise power density [BER=f (Eb/NO)].

(ii) In addition, two sufficiently similar channel impulse responses in different (not necessarily successive) timeslots are assessed, and are averaged if their difference is less than a predetermined limit value. It is thus possible for a lower Eb/NO to be required for a given bit error rate BER than if this information were not used.

(iii) In addition, in the event of two sufficiently similar channel impulse responses whose difference is less than a predetermined limit value, no training information sequence or tests signals (midambles) is or are transmitted each n-th transmission timeslot, for (e.g., every other burst). This allows, in particular, the data rate of the respective subscriber to be increased.

(iv) In addition, LOOK-UP tables are produced for different telecommunications systems carrier frequencies, in which tables the relationship "correlation coefficient" speed of the subscriber with respect to the carrier frequency (absolute speed)" is shown. The tables allow the channel assessment to be simplified. However, one precondition for producing the tables is that the correlation characteristics of assessed channel impulse responses have previously been investigated, and the relative speed of a subscriber is estimated as a function of this. Since the assessed channel impulse responses correlates, the subscriber is moving at a slow relative speed. If the assessed channel impulse responses do not correlate, the subscriber is moving at a high relative speed.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference designation represent like elements throughout and wherein.

Figure 1:
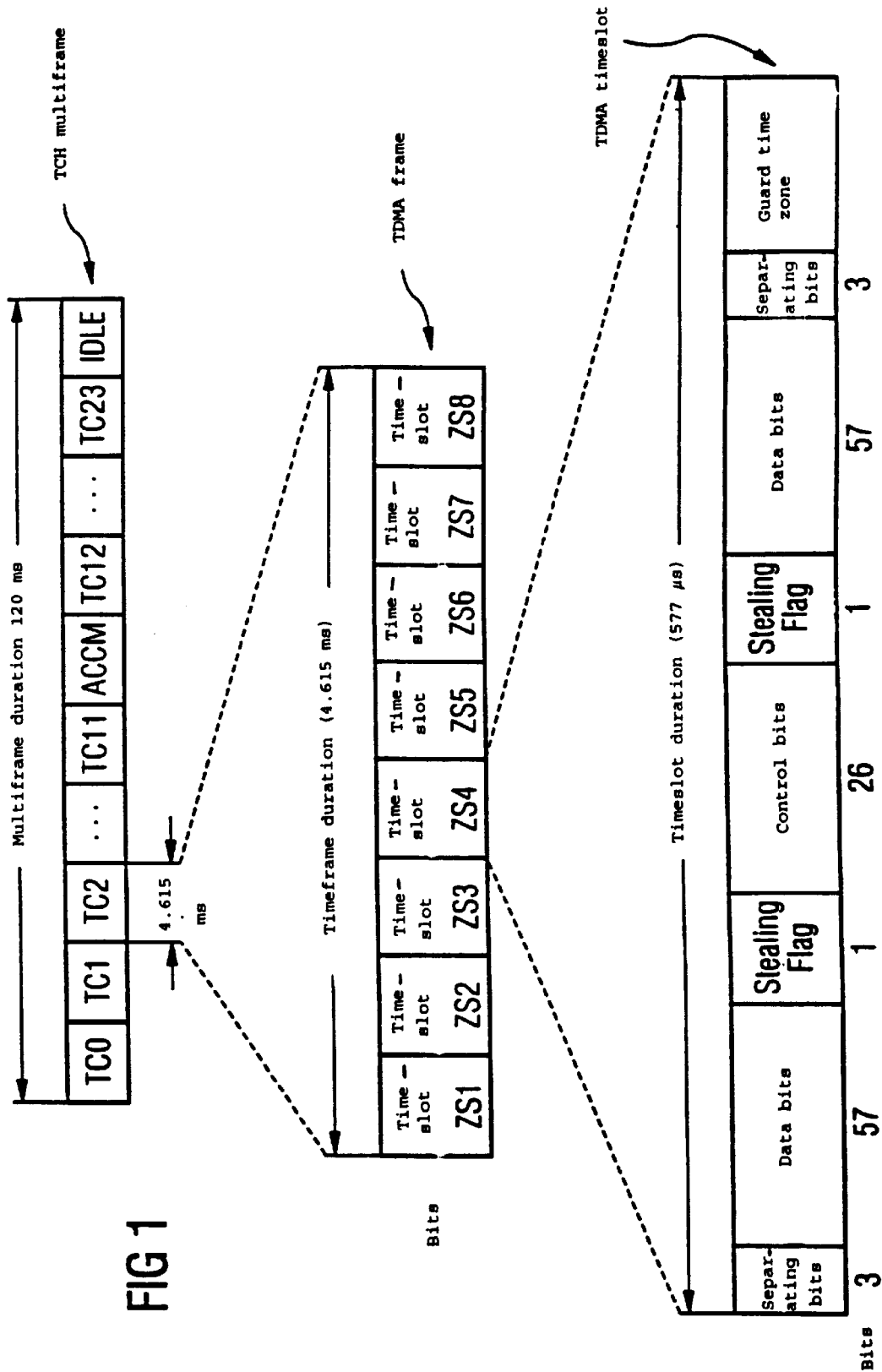
FIG. 1 illustrates TCH multiframe, TDMA frame and TDMA timeslot structure for the GSM mobile radio standard.
Figure 2:
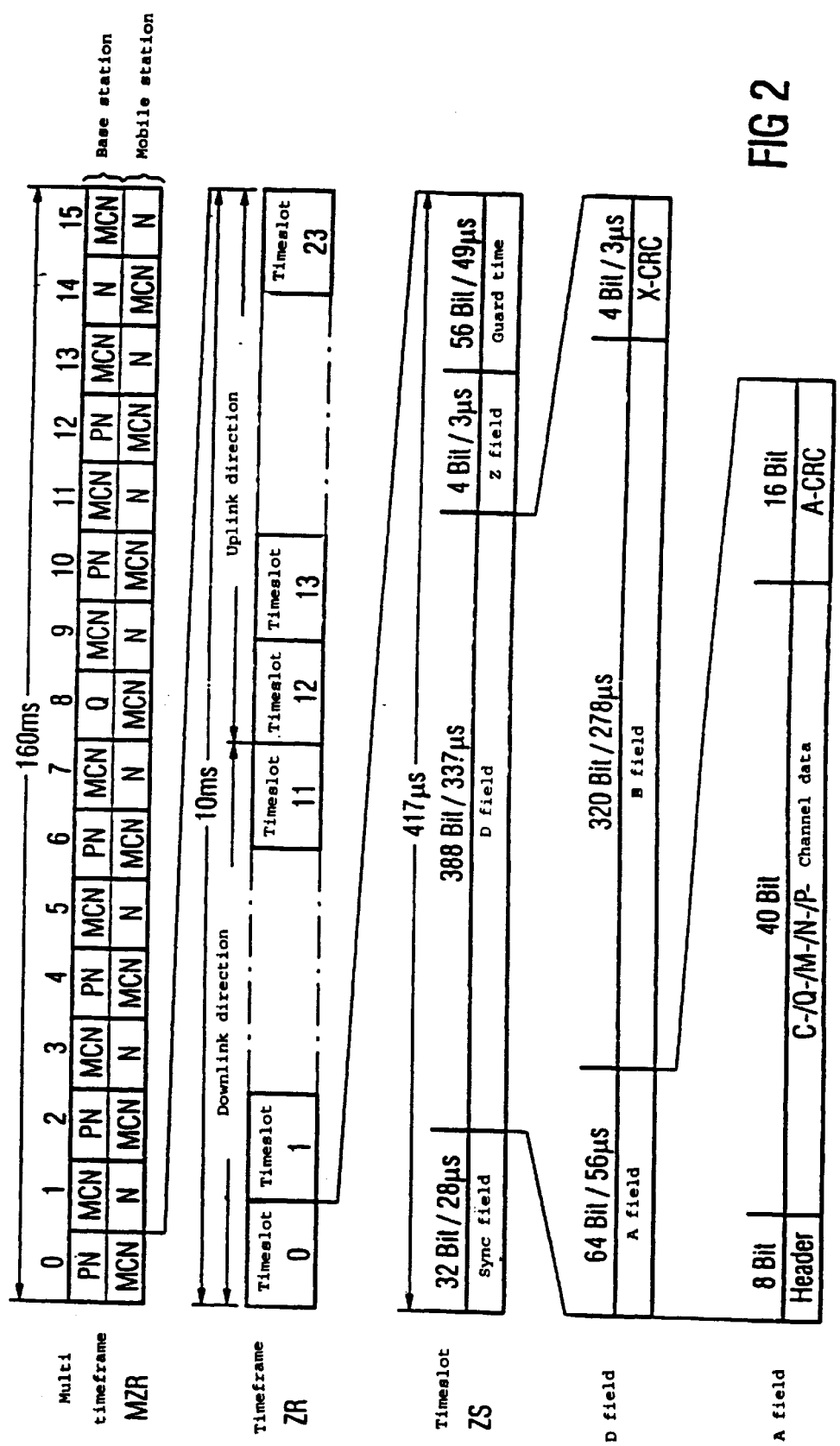
FIG. 2 illustrates the TCH multiframe, TDMA frame and TDMA timeslot structure of the DECT mobile radio standard.
Figure 3:
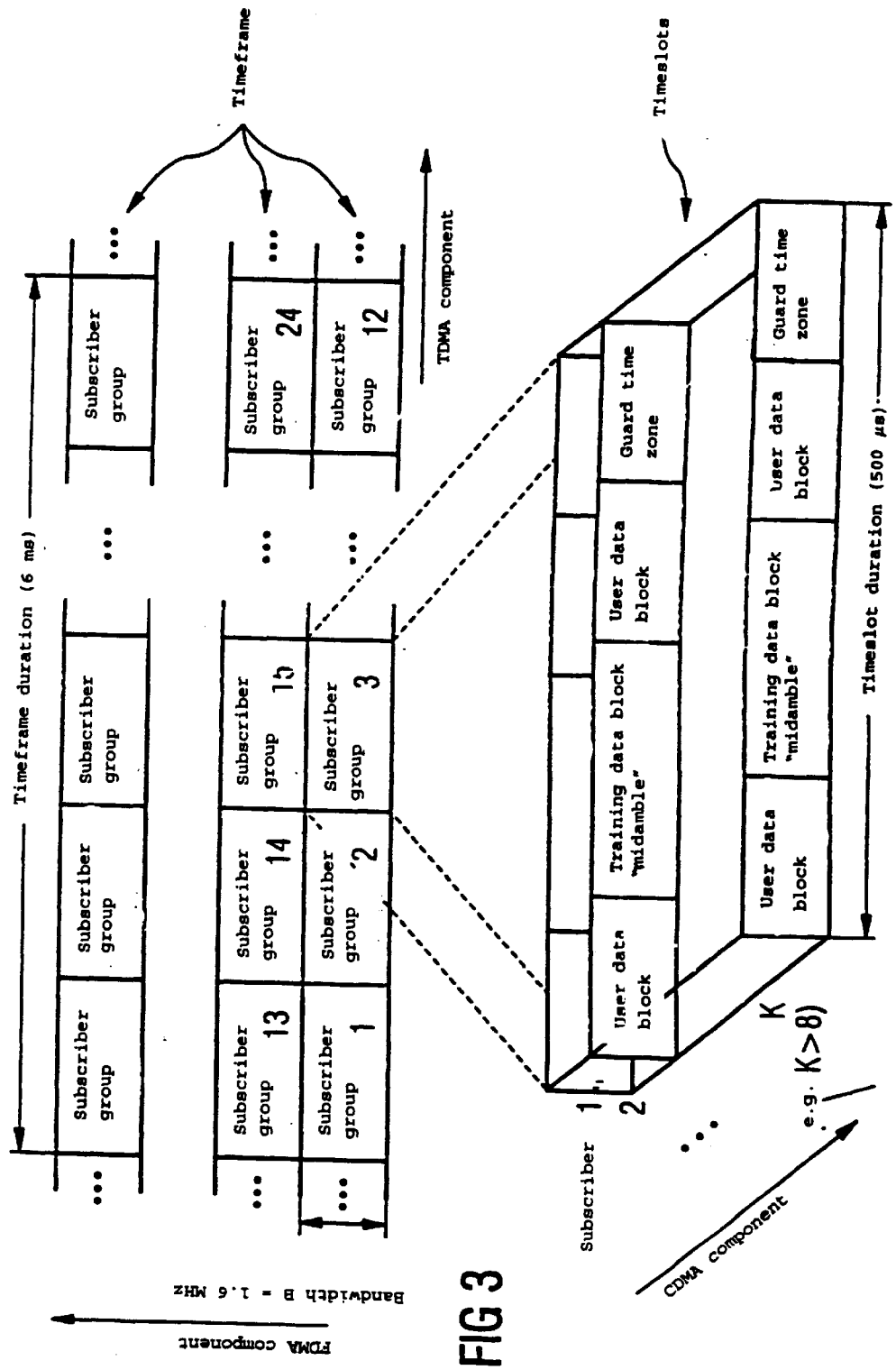
FIG. 3 illustrates a FDMA/TDMA/CDMA multiple access for an uplink path.
Figure 4:
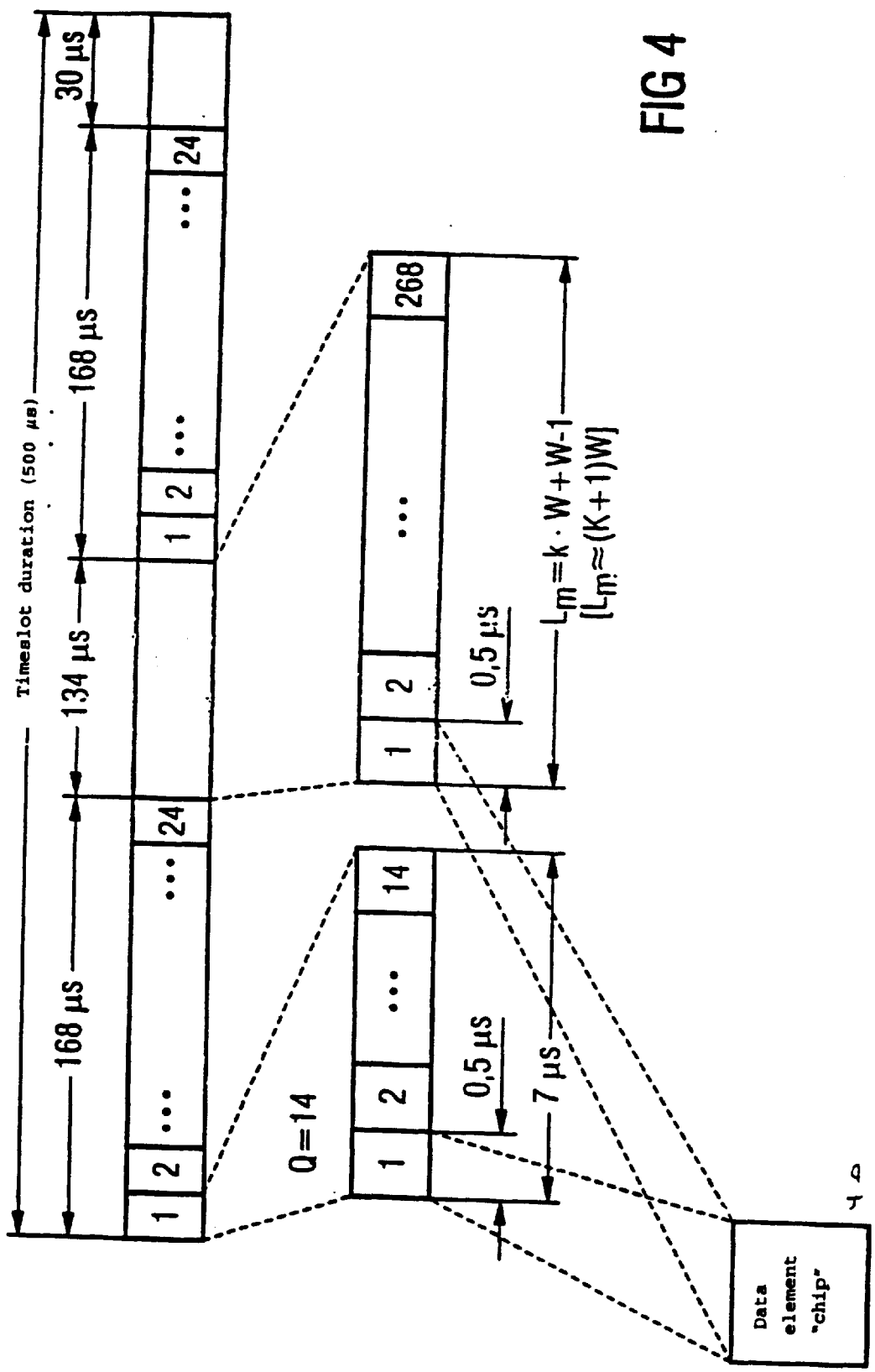
FIG. 4 illustrates a timeslot structure for the uplink path for the joint detection CDMA mobile radio standard.
Figure 5:
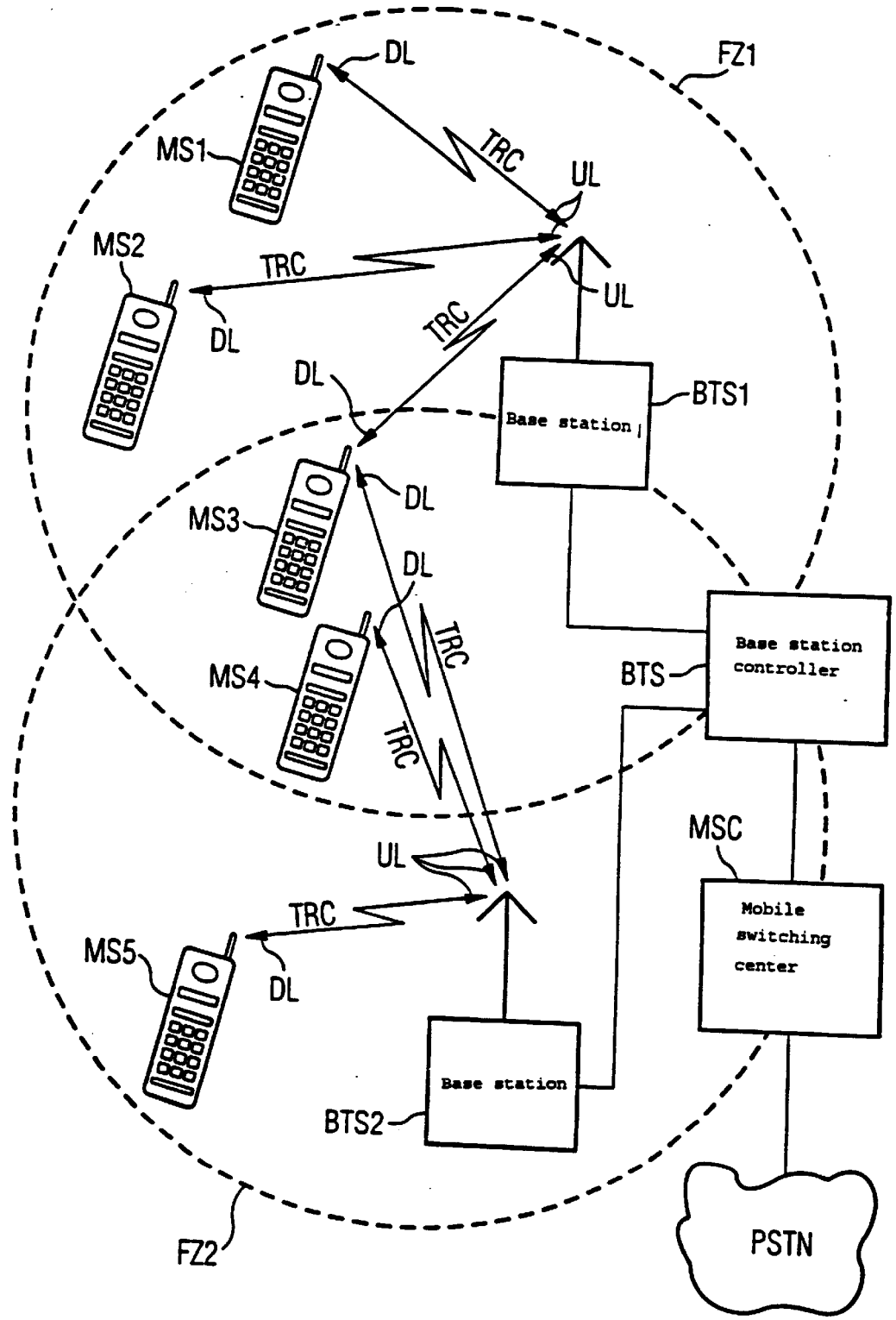
FIG. 5 illustrates an FDMA/TDMA/CDMA radio scenario in which base stations are connected via a radio interface.
Figure 8:
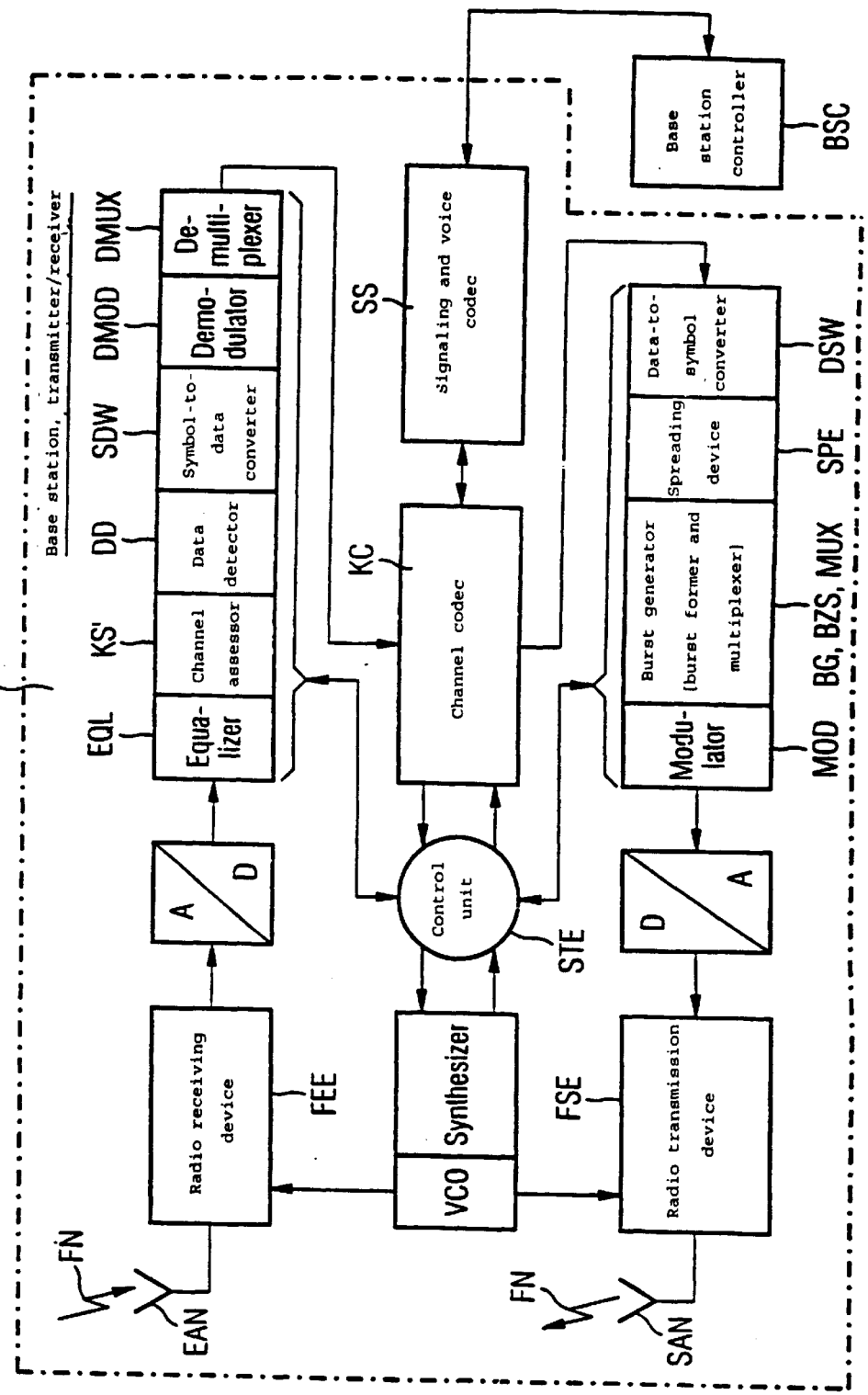
FIG. 8 shows the fundamental layout of an embodiment of a base station.
Figure 9:
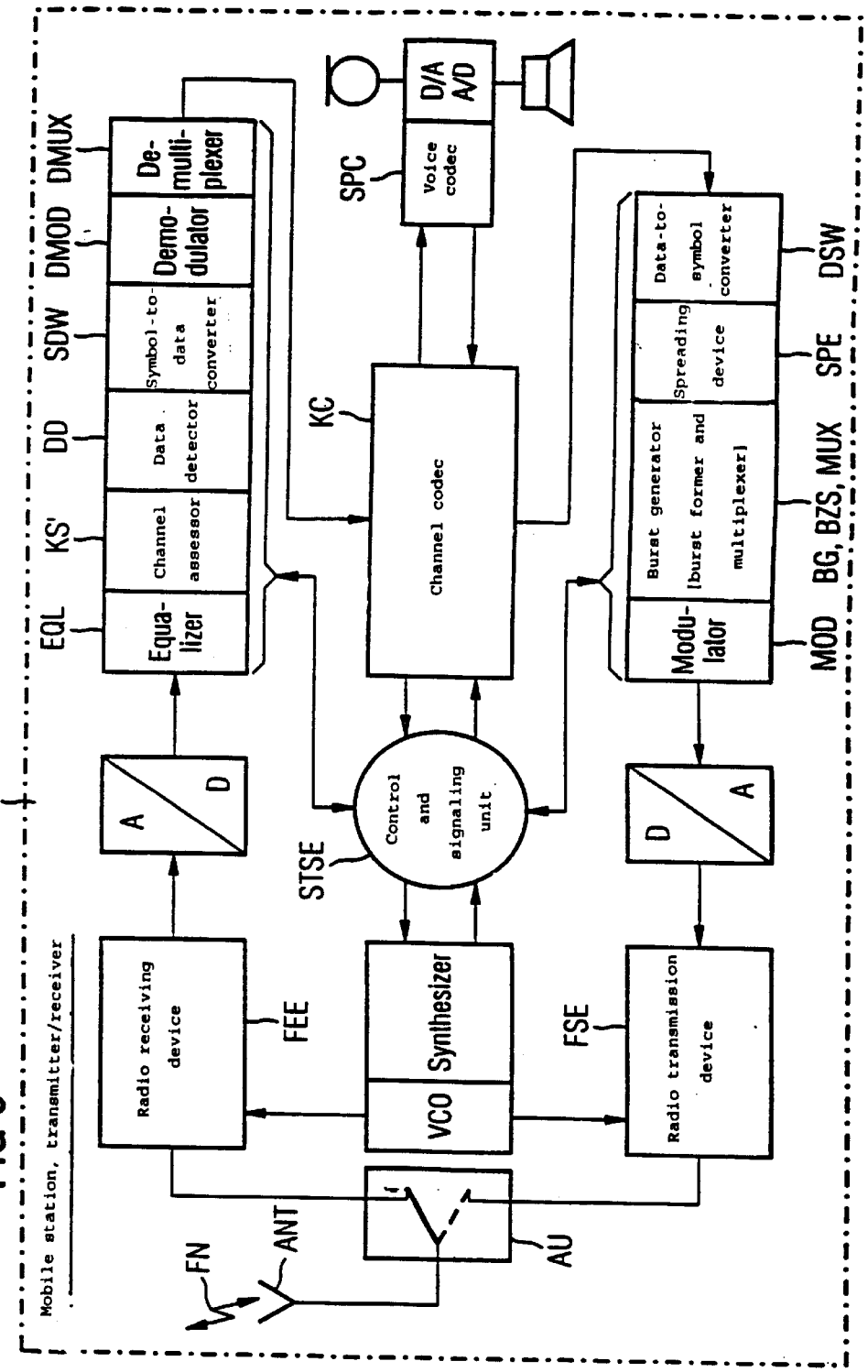
FIG. 9 shows the fundamental layout of an embodiment of a mobile station.

DESCRIPTION OF THE PREFERRED EMBODIMENTS;

Based on FIGS. 6 and 7, FIGS. 8 and 9 show the fundamental layout of a first exemplary embodiment of the base station BTS1, BTS2 (FIG. 8) and of the mobile station MS1 . . . MS5 (FIG. 9), respectively. The major difference between the respective layout shown in FIGS. 6 and 7 and the respective layout shown in FIGS. 8 and 9 is that a modified channel assessor KS' is used for the respective layout shown in FIGS. 8 and 9. This channel assessor KS' is in each case designed in such a manner that, for example based on FIG. 5, a system-internal subscriber at the mobile station MS1 . . . MS5 and/or another system-internal subscriber at the mobile station MS1 . . . MS5 (internal link) or a system-external subscriber in the higher-level PST network (external link) receives the messages intended for him (in the case of TDMA-based telecommunications system, a subscriber to whom, for example, the timeslot "n" of a TDMA frame is assigned), and messages which are intended for other subscribers and are transmitted in the same transmission direction (in the case of TDMA-based telecommunications systems, another subscriber to whom, for example, the timeslot "n−1" of a TDMA frame is assigned) for channel assessment. This allows a considerable improvement to be achieved in the bit error rate (BER or link level performance), which is a function of the bit energy to noise power density [BER=f (Eb/NO)].

Figure 10:
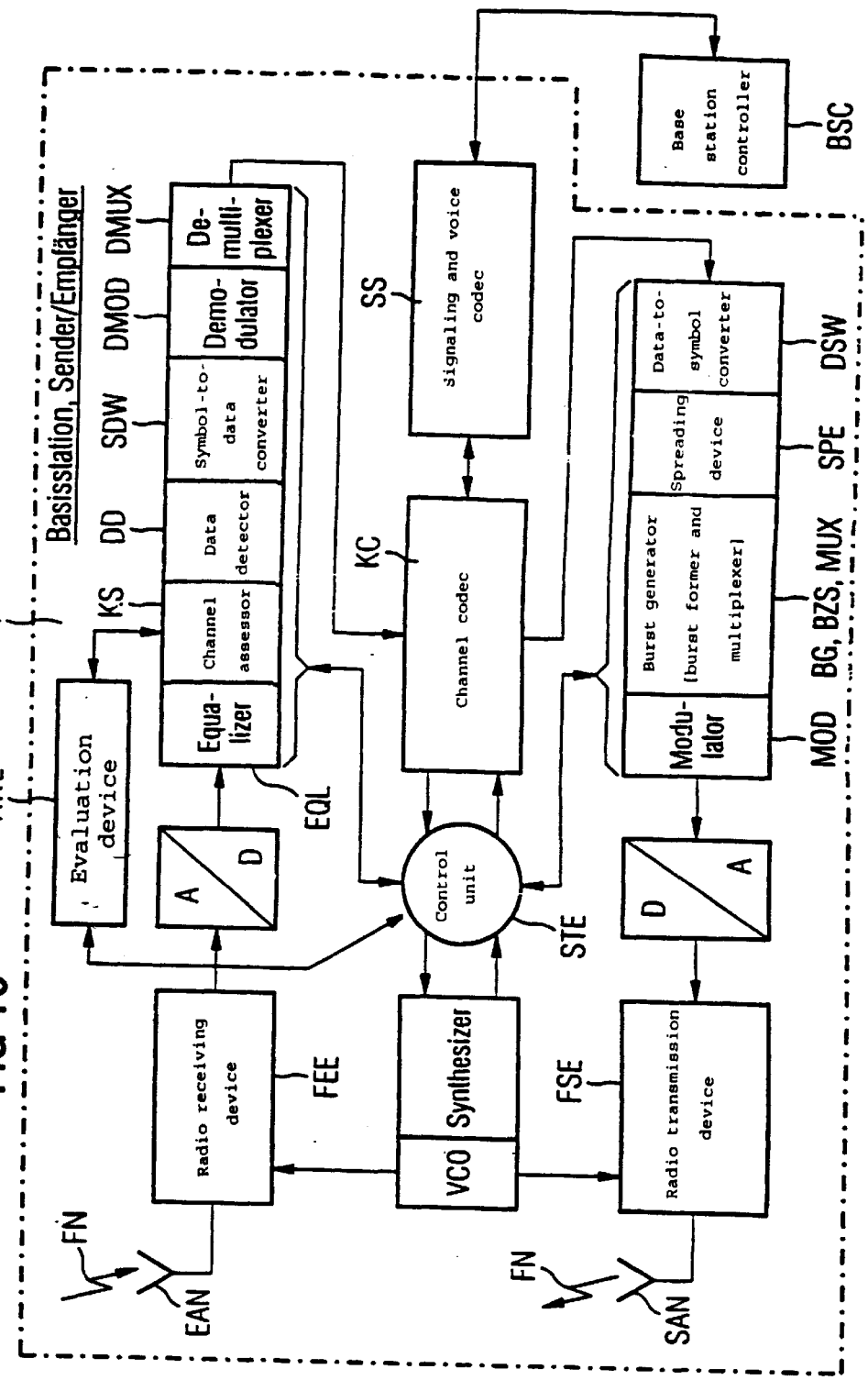
FIG. 10 shows the fundamental layout of a second embodiment of a base station.
Figure 11:
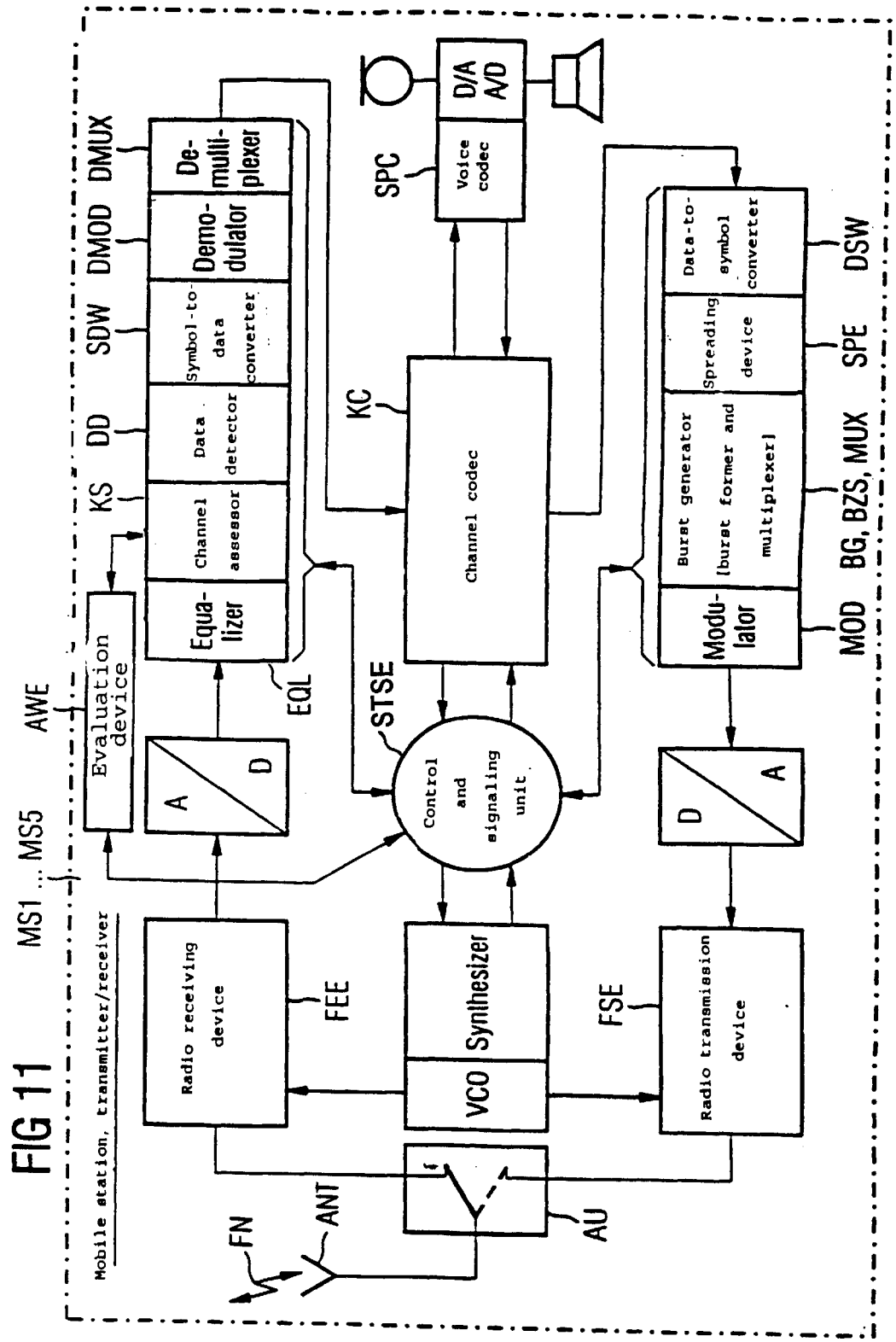
FIG. 11 shows the fundamental layout of a second embodiment of a mobile station.

Based on FIGS. 6 and 7, FIGS. 10 and 11 show the fundamental layout of a second exemplary embodiment of the base station BTS1, BTS2 (FIG. 10) and mobile station MS1 . . . MS5 (FIG. 11), respectively. The major difference between the respective layout shown in FIGS. 6 and 7 and the respective layout shown in FIGS. 10 11 is that an evaluation device AWE is provided in the respective layouts shown in all FIGS. 10 and 11. This evaluation device AWE is respectively bidirectionally assigned to the channel assessor KS and the control unit STE, and to the control and signaling unit STSE, and is connected to them, and thus, together with them, in each case forms a specific channel assessment means. These channel assessment means differ from the respective channel assessors in that two sufficiently similar channel impulse responses, which are supplied by the respective channel assessor KS, are assessed, for example, in different (not necessarily successive) timeslots and whose difference is less than a predetermined limit value are averaged by means of the evaluation device AWE, controlled by the control unit STE or the control and signaling unit STSE. For this purpose, the evaluation device AWE contains, for example, an arithmetic module for averaging, and a comparator. The predetermined limit value is provided, for example, by the control unit STE or the control and signaling unit STSE. It is thus possible for a lower Eb/NO to be required for a given bit error rate BER than if this information were not used.

Figure 12:
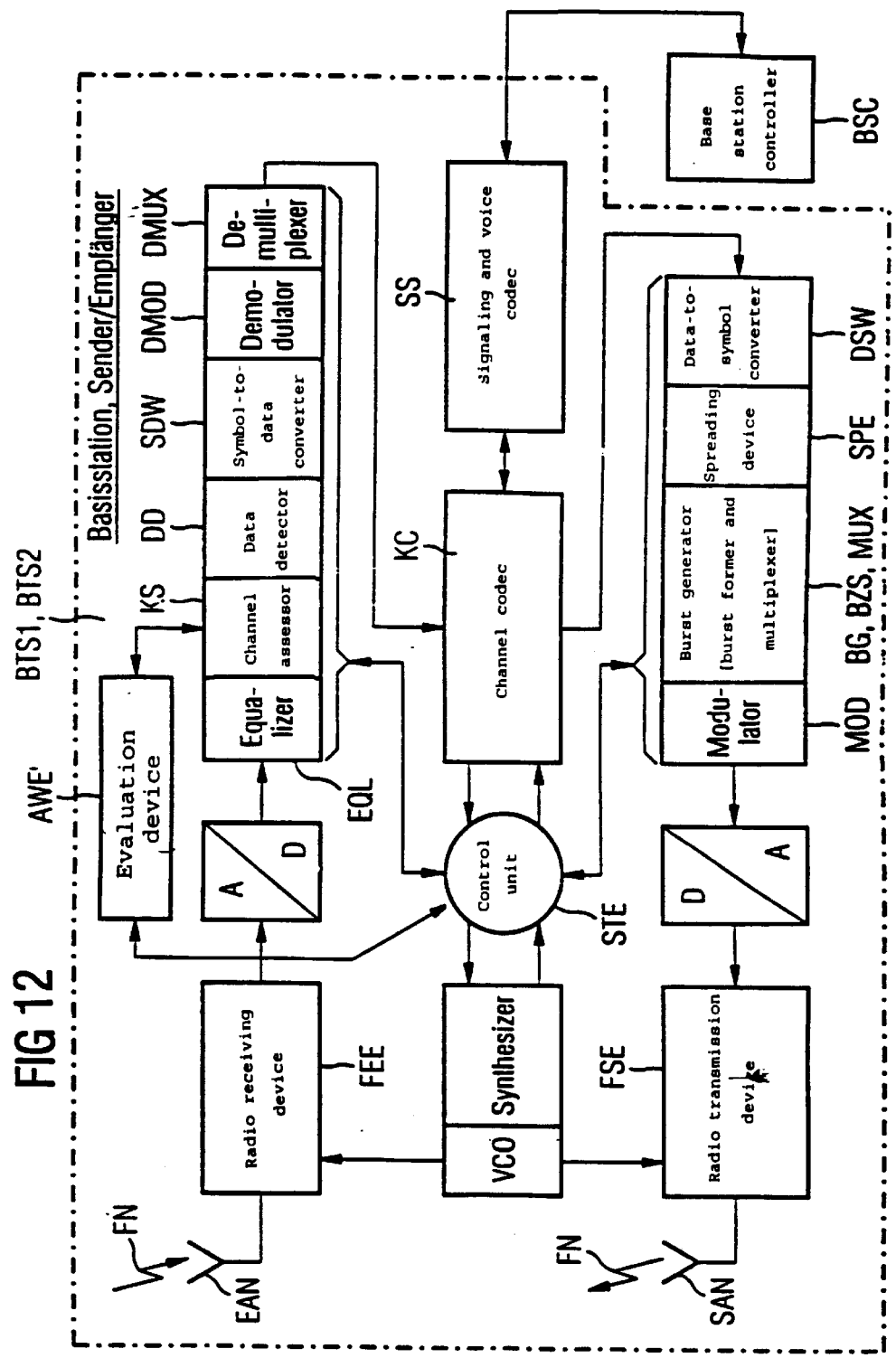
FIG. 12 shows the fundamental layout of a third embodiment of a base station.
Figure 13:
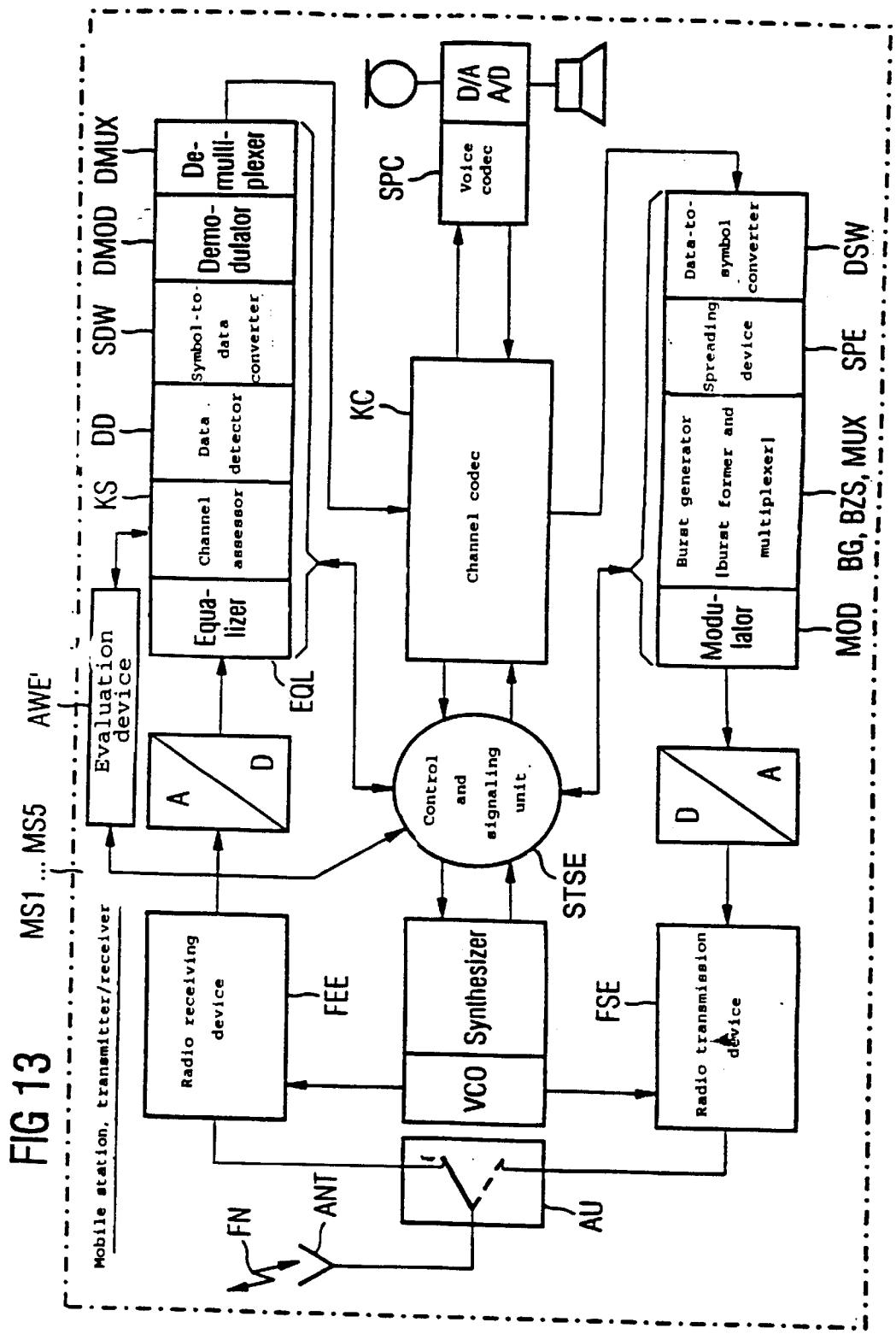
FIG. 13 shows the fundamental layout of a third embodiment of a mobile station.

Based on FIGS. 6 and 7, FIGS. 12 and 13 show the fundamental layout of a third exemplary embodiment of the base station BTS1, BTS2 (FIG. 12) and of the mobile station MS1 . . . MS5 (FIG. 13), respectively. The major difference between the respective layout shown in FIGS. 6 and 7 and the respective layout shown in FIGS. 12 and 13 is that an evaluation device AWE' which is modified in comparison with the evaluation device AWE in FIGS. 10 and 11 is provided in the respective layout shown in FIGS. 12 and 13. This evaluation device AWE' is once again respectively bidirectionally assigned to the channel assessor KS and to the control unit STE or the control and signaling unit STSE, and is connected to them and together with them in each case forms specific channel assessment means. These channel assessment means differ from the respective channel assessor in that two sufficiently similar channel impulse responses, which are supplied by the respective channel assessor KS and are assessed, for example, in different (not necessarily successive) timeslots and whose error is less than a predetermined limit value [lacuna] by means of the evaluation device AWE' and controlled by the control unit STE or the control and signaling unit STSE, no training information sequence or test signals (midambles) is or are transmitted for each n-th transmission timeslot, for example every other burst. The evaluation device AWE' contains, for example, a comparator for this purpose. The determined limit value is, for example, once again provided by the control unit STE or the control and signaling unit STSE. This allows, in particular, the data rate of the respective subscriber to be increased.

Figure 6:
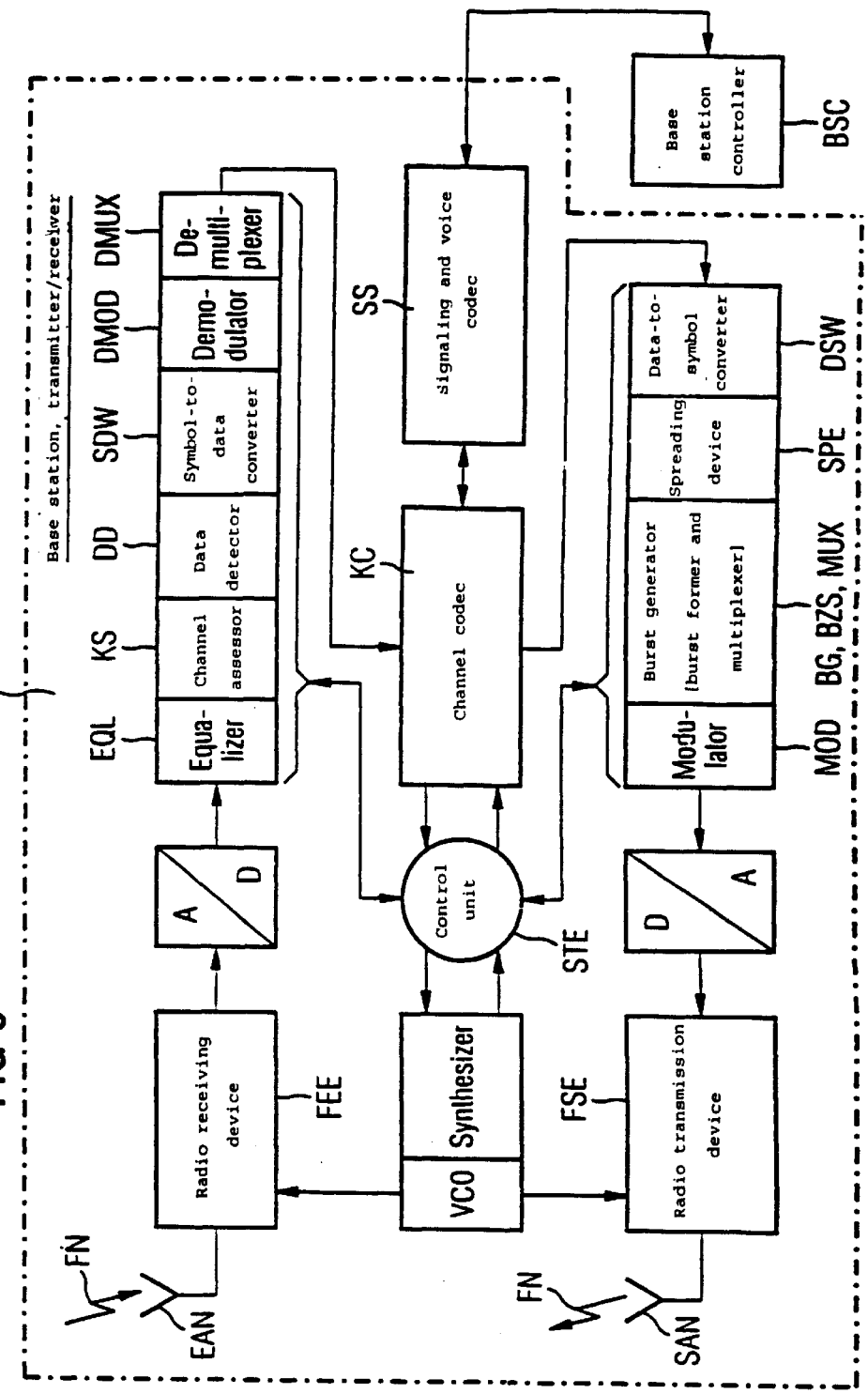
FIG. 6 illustrates a fundamental layout of a conventional base station transmitter/receiver.
Figure 7:
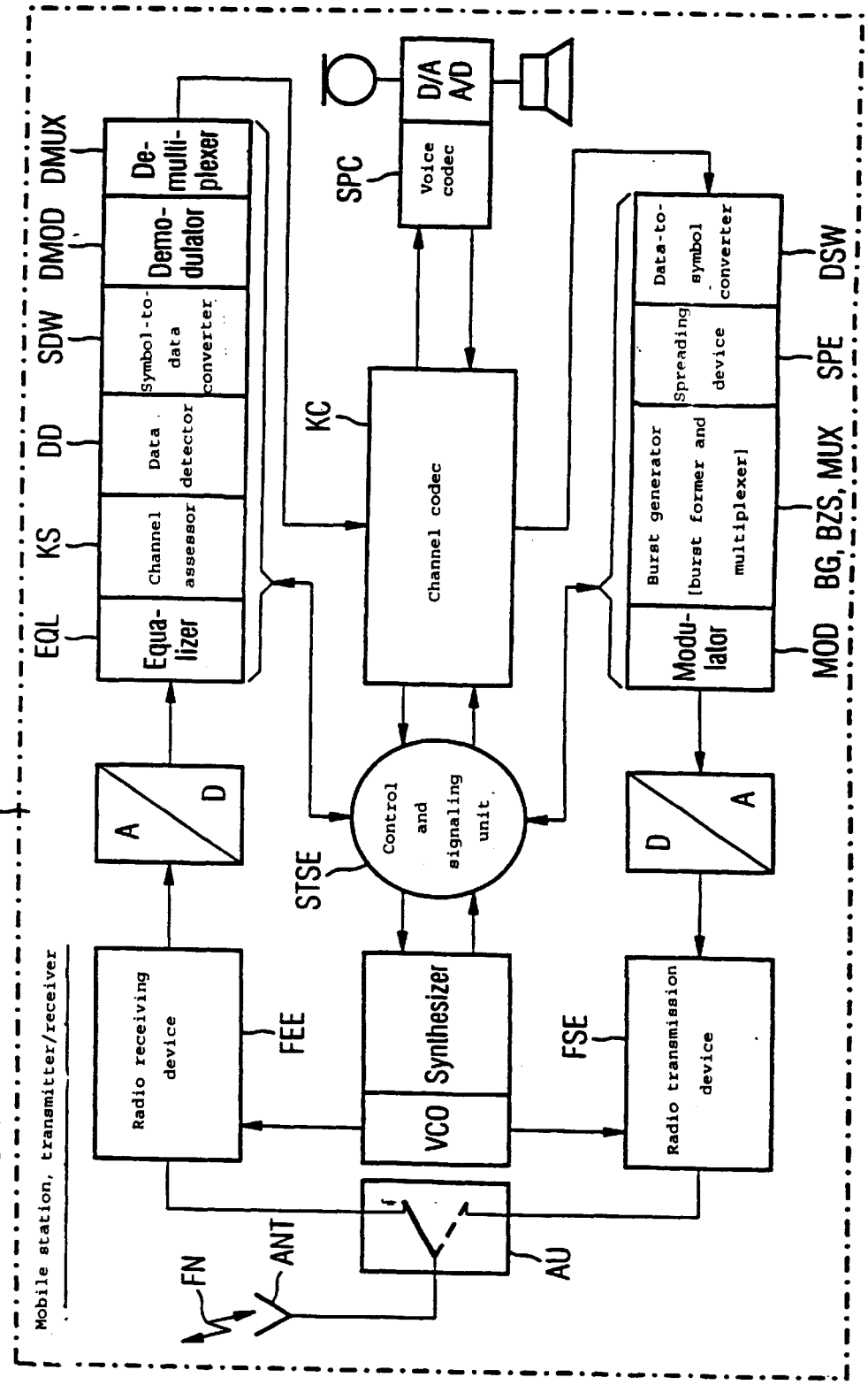
FIG. 7 illustrates a fundamental layout of a conventional mobile station transmitter/receiver.
Figure 14:
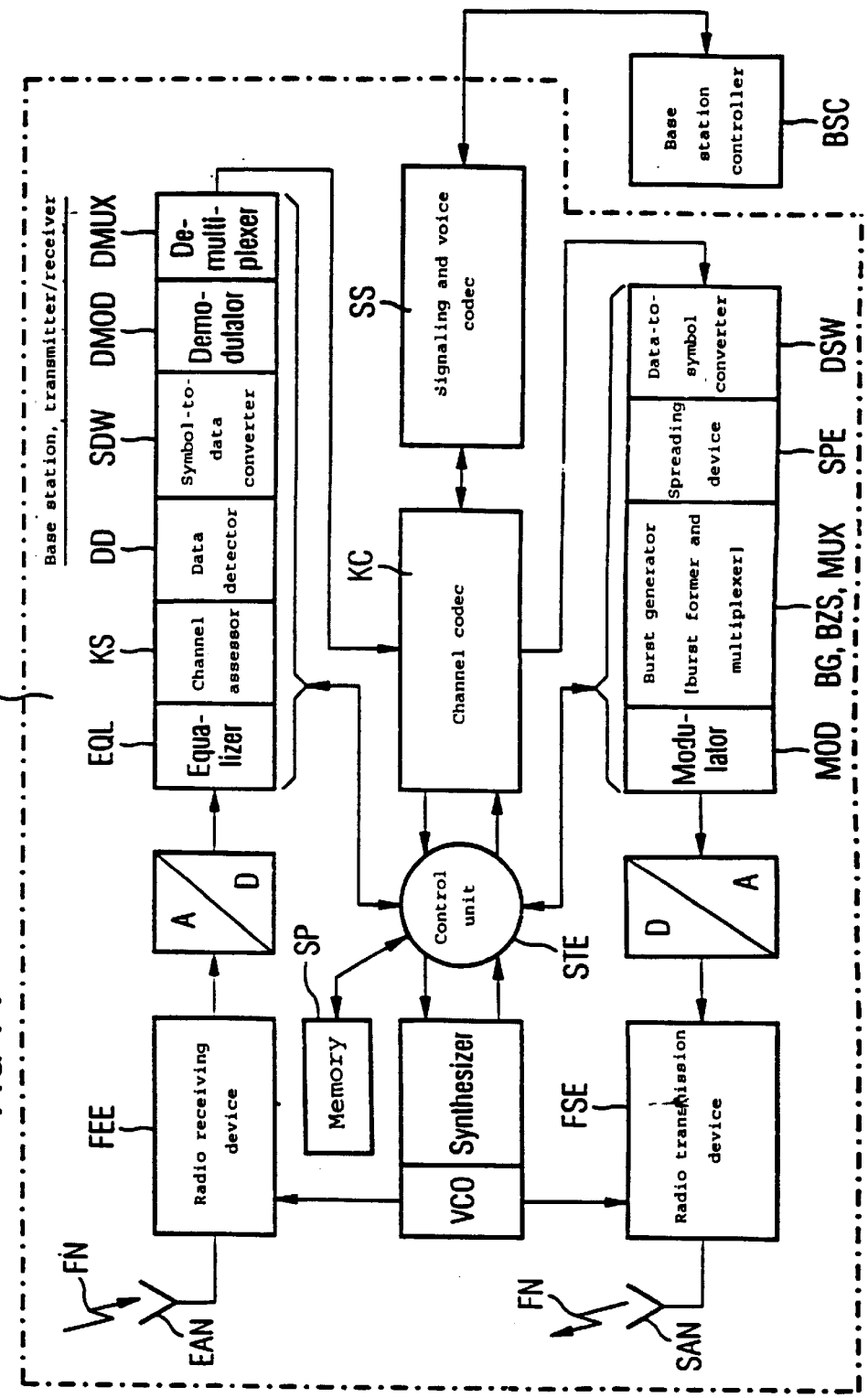
FIG. 14 shows the fundamental layout of a fourth embodiment of a base station.

Based on FIG. 6, FIG. 14 shows the fundamental layout of a fourth exemplary embodiment of the base station BTS1, BTS2. A major difference between the layout shown in FIG. 6 and the layout shown in FIG. 14 is that, a memory SP is provided, which is managed by the control unit STE and, together with the channel assessor KS and the control unit STE, forms a channel assessment means, and in which memory SP LOOK-UP tables can be stored. These LOOK-UP tables are preferably produced for different telecommunications system carrier frequencies. In this case, they indicate the relationship "correlation coefficient" speed of the subscriber related to the carrier frequency (absolute speed)". These tables allow the channel assessment to be simplified. However, production of the tables is dependent on the correlation characteristics of assessed channel impulse responses that have been investigated in advance, and the relative speed of a subscriber being estimated as a function of the correlation characteristics. If the assessed channel impulse responses correlate, the subscriber is moving at a slow relative speed. If the assessed channel impulse responses do not correlate, the subscriber is moving at a relatively high speed.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for assessing transmission channels of a wireless telecommunications system comprising:

transmitting messages between one or more transmitters and at least one first receiver of the telecommunications system via at least one of the transmission channels of the wireless telecommunications system;

receiving a first message transmitted by a first transmitter of the one or more transmitters at the first receiver;

receiving at least one further message transmitted by at least one of the first transmitter, and a further one of the one or more transmitters to at least one further receiver, the at least one further message being transmitted in a same transmission direction as the first message;

estimating channel impulse responses using specified information configured as a training information sequence contained within any one or more of the transmitted messages; and assessing the at least one or more transmission channels based on a correlation of the channel impulse responses.

2. The method as claimed in claim 1, wherein the telecommunications system utilizes a TDMA multiple access method to transmit messages.

3. The method as claimed in claim 2, further comprising:
assigning the transmitted messages to timeslots;
estimating channel impulse responses for the timeslots in the messages using the specified information;
estimating a first channel impulse response for a first received timeslot used by a first transceiver; and
estimating a second channel impulse response for a second received timeslot used by the first transceiver;
determining a sufficient similarity between the first channel impulse response and the second channel impulse response when a difference by which the first channel impulse response differs from the second channel impulse response is less than a predetermined limit value; and
forming a mean channel impulse response from the first channel impulse response and the second channel impulse response when the first and second channel impulse responses are determined to be sufficiently similar.

4. The method as claimed in claim 2, further comprising:
assigning the transmitted messages to timeslots;
estimating channel impulse responses for the timeslots in the messages using the specified information;
estimating a first channel impulse response for a first received timeslot used by a first transceiver; and
estimating a second channel impulse response for a second received timeslot used by the first transceiver;
determining a sufficient similarity between the first channel impulse response and the second channel impulse response when a difference by which the first channel impulse response differs from the second channel impulse response is less than a predetermined limit value; and
preventing transmission of a training information sequence contained in each transmitted message for each n-th transmission timeslot of an opposing station of the first transceiver, where n is greater than 1, when the first channel impulse response and the second channel impulse response are determined to be sufficiently similar.

5. The method as claimed in claim 3, wherein the first transceiver is a base station.

6. The method as claimed in claim 3, wherein the first transceiver is a mobile station.

7. The method as claimed in claim 3, wherein the first received timeslot and the second received timeslot directly follow one another.

8. The method as claimed in claim 3, wherein the first received timeslot and the second received timeslot are in one TDMA frame.

9. The method as claimed in claim 3, wherein the first received timeslot and the second received timeslot are in different TDMA frames.

10. The method as claimed in claim 4, wherein n is equal to 2.

11. The method as claimed in claim 3, further comprising:
preventing transmission of a training information sequence contained in each transmitted message for each n-th transmission timeslot of an opposing station of the first transceiver, where n is greater than 1, when the first channel impulse response and the second channel impulse response are determined to be sufficiently similar.

12. The method as claimed in claim 1, further comprising:
estimating a first channel impulse response of the transmitted messages being transmitted in frequency bands by a stationary transceiver using the specified information configured as the training information sequence contained within any one or more of the transmitted messages;
estimating a second channel impulse response by the stationary transceiver using further specified information configured as a further training information sequence contained within any one or more of the transmitted messages;
determining a sufficient similarity between the first channel impulse response and the second channel impulse response when a difference by which the first channel impulse response differs from the second channel impulse response is less than a predetermined limit value; and
defining a speed related to the respective frequency band of a mobile transceiver as slow when the first channel impulse response and the second channel impulse response are determined to be sufficiently similar;
producing a LOOK UP table which indicates the relationship of a correlation coefficient versus speed; and
estimating a predetermined number of successive channel impulse responses estimated by the stationary transceiver based on the LOOK UP table.

13. The method as claimed in claim 12, wherein the stationary transceiver is a base station, and the mobile transceiver is a mobile station.

14. The method as claimed in claim 1, wherein the first transmitter is a mobile station, and the first receiver is a base station.

15. A method for assessing transmission channels of a wireless telecommunications system which utilizes a TDMA multiple access method to transmit messages, the method comprising:
transmitting messages assigned to timeslots via at least one of the transmission channels between transceivers in the telecommunications system;
estimating channel impulse responses using specified information configured as a training information sequence contained within any one or more of the transmitted messages
estimating a first channel impulse response for a first received timeslot used by a first transceiver;
estimating a second channel impulse response for a second received timeslot used by the first transceiver;
determining a sufficient similarity between the first channel impulse response and the second channel impulse response when a difference by which the first channel impulse response differs from the second channel impulse response is less than a predetermined limit value; and forming a mean channel impulse response from the first channel impulse response and the second channel impulse response when the first and second channel impulse responses are determined to be sufficiently similar.

16. The method as claimed in claim 15, further comprising:

preventing transmission of a training information sequence contained in each transmitted message for each n-th transmission timeslot of an opposing station of the first transceiver where n is greater than 1, when the first channel impulse response and the second channel impulse response are as determined to be sufficiently similar.

17. The method as claimed in claim 16, further comprising:

estimating a first channel impulse response by a stationary transceiver;

estimating a second channel impulse response by the stationary transceiver;

defining a speed related to the respective frequency band of a mobile transceiver as slow when the first channel impulse response and the second channel impulse response are determined to be sufficiently similar;

producing a LOOK UP table which indicates the relationship of a correlation coefficient versus speed; and estimating a predetermined number of successive channel impulse responses estimated by the stationary transceiver based on the LOOK UP table.

18. The method as claimed in claim 17, wherein the stationary transceiver is a base station, and the mobile transceiver is a mobile station.

19. The method as claimed in claim 16, wherein n is equal to 2.

20. The method as claimed in claim 15, wherein the first transceiver is a base station.

21. The method as claimed in claim 15, wherein the first transceiver is a mobile station.

22. The method as claimed in claim 15, wherein the first received timeslot and the second received timeslot directly follow one another.

23. The method as claimed in claim 15, wherein the first received timeslot and the second received timeslot are in one TDMA frame.

24. The method as claimed in claims 15, wherein the first received timeslot and the second received timeslot are in different TDMA frames.

25. A method for assessing transmission channels of a wireless telecommunications system which utilizes a TDMA multiple access method to transmit messages comprising:

transmitting messages assigned to timeslots between transceivers in the wireless telecommunications system via at least one of the transmission channels of the telecommunications system;

estimating channel impulse responses for each of the timeslots using specified information, the information configured as a training information sequence contained in each of the transmitted messages timeslots;

estimating a first channel impulse response for a first received timeslot used by a first transceiver;

estimating a second channel impulse response for a second received timeslot used by the first transceiver determining a sufficient similarity between the first channel impulse response and the second channel impulse response when a difference by which the first channel impulse response differs from the second channel impulse response is less than a predetermined limit value; and preventing transmission of a training information sequence contained in each transmitted message for each n-th transmission timeslot of an opposing station of the first transceiver, where n is greater than 1 when the first channel impulse response and the second channel impulse response are determined to be sufficiently similar.

26. The method as claimed in claim 25, further comprising:

estimating a first channel impulse response by a stationary transceiver using the specified information configured as the training information sequence contained within any one or more of the transmitted messages;

estimating a second channel impulse response by the stationary transceiver using further specified information configured as a further training information sequence contained within any one or more of the transmitted messages;

defining a speed related to the respective frequency band of a mobile transceiver as slow when the first channel impulse response and the second channel impulse response are determined to be sufficiently similar;

producing a LOOK UP table which indicates the relationship of a correlation coefficient versus speed; and estimating a predetermined number of successive channel impulse responses estimated by the stationary transceiver based on the LOOK UP table.

27. The method as claimed in claim 26, wherein the stationary transceiver is a base station, and the mobile transceiver is a mobile station.

28. The method as claimed in claim 25, wherein the first transceiver is a base station.

29. The method as claimed in claim 25, wherein the first transceiver is a mobile station.

30. The method as claimed in claim 25, wherein the first received timeslot and the second received timeslot directly follow one another.

31. The method as claimed in claim 25, wherein the first received timeslot and the second received timeslot are in one TDMA frame.

32. The method as claimed in claim 25, wherein the first received timeslot and the second received timeslot are in different TDMA frames.

33. The method as claimed in claim 25, wherein n is equal to 2.

34. A method for assessing transmission channels of a wireless telecommunications system wherein messages are transmitted in frequency bands via the transmission channels between transmitters and receivers in the telecommunications system comprising:

estimating a first channel impulse response by a stationary transceiver using specified information configured as a training information sequence contained within any one or more of the transmitted messages, estimating a second channel impulse response by the stationary transceiver using further specified information configured as a further training information sequence contained within any one or more of the transmitted messages;

determining a sufficient similarity between the first channel impulse response and the second channel impulse response when a difference by which the first channel impulse response differs from the second channel impulse response is less than a predetermined limit value;

defining a speed related to the respective frequency band of a mobile transceiver as slow when the first channel impulse response and the second channel impulse response are determined to be sufficiently similar;

producing a LOOK UP table which indicates the relationship of a correlation coefficient versus speed; and estimating a predetermined number of successive channel impulse responses estimated by the stationary transceiver based on the LOOK UP table.

35. The method as claimed in claim 34, wherein the telecommunications system is based on a CDMA multiple-access method to transmit messages.

36. The method as claimed in claim 35, wherein the telecommunications system utilizes a JD-CDMA multiple-access method to transmit messages.

37. The method as claimed in claim 34, wherein the first transceiver is a base station.

38. The method as claimed in claim 34, wherein the first transceiver is a mobile station.

39. The method as claimed in claim 34, wherein the stationary transceiver is a base station, and the mobile transceiver is a mobile station.

40. A transceiver for assessing transmission channels of a wireless telecommunications system, the transceiver comprising:

at least one transmitter to transmit messages between the transceiver and one or more further transceivers each opposing the transceiver via at least one of the transmission channels of the wireless telecommunications system;

a receiver to receive a first message transmitted by at a first transmitter of at least one of the one or more further transceivers and for receiving at least one further message transmitted by at least one of the first transmitter and a further transmitter of the one or more further transceivers in a same transmission direction as the first message;

first channel impulse response estimating means for estimating channel impulse responses using specified information configured as a training information sequence contained within each of the one or more messages received by the transceiver; and a channel assessment unit to assess the at least one channel based on a correlation of the channel impulse responses.

41. The transceiver as claimed in claim 40, wherein the telecommunications system is a telecommunications system based on a TDMA multiple-access method to transmit messages.

42. The transceiver as claimed in claim 41, wherein the messages are assigned to timeslots and the transceiver further comprises:

second channel impulse response estimating means for estimating channel impulse responses for the timeslots using specified information, the information being configured as a training information sequence contained in each of the messages;

a third channel impulse response estimating means for estimating a first channel impulse response for a first received timeslot;

a fourth channel impulse response estimating means for estimating a second channel impulse response for a second received timeslot a first determining unit configured to determine a sufficient similarity between the first channel impulse response and the second channel impulse response when a difference by which the first channel impulse response differs from the second channel impulse response is less than a predetermined limit value; and a forming unit configured to form a mean channel impulse response from the first channel impulse response and the second channel impulse response when the first and second channel impulse responses are determined to be sufficiently similar.

43. The transceiver as claimed in claim 41, wherein the transmitted messages are assigned to timeslots and the transceiver further comprises second channel impulse response estimating means for estimating channel impulse responses for the timeslots using specified information, the information being configured as a training information sequence contained in each of the messages;

a third channel impulse response estimating means for estimating a first channel impulse response for a first received timeslot;

a fourth channel impulse response estimating means for estimating a second channel impulse response for a second received timeslot a first determining unit configured to determine a sufficient similarity between the first channel impulse response and the second channel impulse response when a difference by which the first channel impulse response differs from the second channel impulse response is less than a predetermined limit value; and a preventing unit configured to prevent transmission of a training information sequence contained in each transmitted message for each n-th transmission timeslot of an opposing station of the transceiver, where n is greater than 1 when the first channel impulse response and the second channel impulse response are identified as sufficiently similar.

44. The transceiver as claimed in claim 42, wherein the first received timeslot and the second received timeslot directly follow one another.

45. The transceiver as claimed in claim 42, wherein the first received timeslot and the second received timeslot are in one TDMA frame.

46. The transceiver as claimed in claim 42, wherein the first received timeslot and the second received timeslot are in different TDMA frames.

47. The transceiver as claimed in claim 43, wherein n is equal to 2.

48. The transceiver as claimed in claim 43, wherein first received timeslot and a second received timeslot directly follow one another.

49. The transceiver as claimed in claim 43, wherein the first received timeslot and the second received timeslot are in one TDMA frame.

50. The transceiver as claimed in claim 43, wherein the first received timeslot and the second received timeslot are in different TDMA frames.

51. The transceiver as claimed in claim 40, the transceiver further comprising:

second channel impulse response estimating means for estimating channel impulse responses for the timeslots using specified information, the information being configured as a training information sequence contained in each of the messages;

a third channel impulse response estimating means for estimating a first channel impulse response for a first received timeslot;

a fourth channel impulse response estimating means for estimating a second channel impulse response for a second received timeslot a first determining unit configured to determine a sufficient similarity between the first channel impulse response and the second channel impulse response when a difference by which the first channel impulse response differs from the second channel impulse response is less than a predetermined limit value;

a defining unit configured to define a speed related to the respective frequency band of a mobile transceiver opposing the transceiver when the first channel impulse response and the second channel impulse response are determined to be sufficiently similar;

a production unit configured to produce a LOOK UP table which indicates the relationship of a correlation coefficient versus speed; and an estimating unit configured to estimate a predetermined number of successive channel impulse responses based on the LOOK UP table.

52. The transceiver as claimed in claim 51, wherein the transceiver is a base station, and at least one of the opposing transceivers is a mobile station.

53. The transceiver as claimed in claim 40, wherein the telecommunications system is a telecommunications system based on a CDMA multiple-access method to transmit messages.

54. The transceiver as claimed in claim 53, wherein the telecommunications system is a JD-CDMA telecommunications system.

55. The transceiver as claimed in claim 40, wherein the transceiver at least one of a base station and a mobile station.

56. The transceiver as claimed in claim 40, wherein each of the opposing transceivers comprise at least one of a mobile station and a base station.

57. A transceiver for assessing transmission channels of a wireless telecommunications system wherein messages are assigned to timeslots, the transceiver comprising:

a first channel impulse response estimating unit configured to estimate a first channel impulse response using specified information configured as a training information sequence contained within any one or more of the transmitted messages;

a second channel impulse response estimating unit configured to estimate a second channel impulse response using further specified information configured as a further training information sequence contained within any one or more of the transmitted messages;

a first determining unit configured to determine a sufficient similarity between the first channel impulse response and the second channel impulse response when a difference by which the first channel impulse response differs from the second channel impulse response is less than a predetermined limit value; and a forming unit configured to form a mean channel impulse response from the first channel impulse response and the second channel impulse response when the first and second channel impulse responses are determined to be sufficiently similar.

58. The transceiver as claimed in claim 57 further comprising:

a preventing unit configured to prevent transmission of a training information sequence contained in each transmitted message for each n-th transmission timeslot of an opposing station of the transceiver, where n is greater than 1 when the first channel impulse response and the second channel impulse response are identified as sufficiently similar.

59. The transceiver as claimed in claim 58, wherein n is equal to 2.

60. The transceiver as claimed in claim 57, further comprising:

a defining unit configured to define a speed related to the respective frequency band of a mobile transceiver opposing the transceiver when the first channel impulse response and the second channel impulse response are determined to be sufficiently similar;

a production unit configured to produce a LOOK UP table which indicates the relationship of a correlation coefficient versus speed; and an estimating unit configured to estimate a predetermined number of successive channel impulse responses based on the LOOK UP table.

61. The transceiver as claimed in claim 60, wherein the transceiver is a base station, and the opposing station is a mobile station.

62. The transceiver as claimed in claim 57, wherein the telecommunications system is a telecommunications system based on TDMA/CDMA multiple-access methods.

63. The transceiver as claimed in claim 62, wherein the telecommunications system is a JD-CDMA telecommunications system.

64. The transceiver as claimed in claim 57, wherein the transceiver comprises at least one of a base station and a mobile station.

65. The transceiver as claimed in 57, wherein the opposing station comprises at least one of a mobile station and a base station.

66. The transceiver as claimed in claim 57, wherein a first received timeslot and a second received timeslot directly follow one another.

67. The transceiver as claimed in claim 57, wherein a first received timeslot and a second received timeslot are in one TDMA frame.

68. The transceiver as claimed in claim 57, wherein a first received timeslot and a second received timeslot are in different TDMA frames.

69. A transceiver for assessing transmission channels of a wireless telecommunications system wherein messages are assigned to timeslots, the transceiver comprising:

a first channel impulse response estimating unit configured to estimate a first channel impulse response using specified information configured as a training information sequence contained within any one or more of the transmitted messages;

a second channel impulse response estimating unit configured to estimate a second channel impulse response using further specified information configured as a further training information sequence contained within any one or more of the transmitted messages;

a determining unit configured to determine a sufficient similarity between the first channel impulse response and the second channel impulse response when a difference by which the first channel impulse response differs from the second channel impulse response is less than a predetermined limit value; and a transmission preventing unit configured for preventing transmission of a training information sequence contained in each transmitted message for each n-th transmission timeslot of an opposing station of the transceiver, where n is greater than 1, when the first channel impulse response and the second channel impulse response are to be sufficiently similar.

70. The transceiver as claimed in claim 69, further comprising:
- a defining unit configured to define a speed related to the respective frequency band of a mobile transceiver opposing the transceiver when the first channel impulse response and the second channel impulse response are determined to be sufficiently similar;
- a production unit configured to produce a LOOK UP table which indicates the relationship of a correlation coefficient versus speed; and
- an estimating unit configured to estimate a predetermined number of successive channel impulse responses based on the LOOK UP table.

71. The transceiver as claimed in claim 70, wherein the transceiver is a base station, and the opposing station is a mobile station.

72. The transceiver as claimed in claim 69, wherein the telecommunications system is a telecommunications system based on TDMA/CDMA multiple-access methods.

73. The transceiver as claimed in claim 72, wherein the telecommunications system is a JD-CDMA telecommunications system.

74. The transceiver as claimed in claim 69, wherein the transceiver comprises at least one of a base station and a mobile station.

75. The transceiver as claimed in 69, wherein the opposing station comprises at least one of a mobile station and a base station.

76. The transceiver as claimed in claim 69, wherein the first received timeslot and the second received timeslot directly follow one another.

77. The transceiver as claimed in claim 69, wherein the first received timeslot and the second received timeslot are in one TDMA frame.

78. The transceiver as claimed in claim 69, wherein the first received timeslot and the second received timeslot are in different TDMA frames.

79. The transceiver as claimed in claim 69, wherein n is equal to 2.

80. A transceiver for assessing transmission channels of a wireless telecommunications system transmitting messages via at least one transmission channel of the wireless telecommunications system, the transceiver comprising:
- a first channel impulse response estimating unit configured to estimate a first channel impulse response using specified information configured as a training information sequence contained within any one or more of the transmitted messages;
- a second channel impulse response estimating unit configured to estimate a second channel impulse response using further specified information configured as a further training information sequence contained within any one or more of the transmitted messages;
- a determining unit configured to determine a sufficient similarity between the first channel impulse response and the second channel impulse response when a difference by which the first channel impulse response differs from the second channel impulse response is less than a predetermined limit value;
- a defining unit configured to define a speed related to the respective frequency band of a mobile transceiver opposing the transceiver when the first channel impulse response and the second channel impulse response are determined to be sufficiently similar;
- a production unit configured to produce a LOOK UP table which indicates the relationship of a correlation coefficient versus speed; and
- an estimating unit configured to estimate a predetermined number of successive channel impulse responses based on the LOOK UP table.

81. The transceiver as claimed in claim 80, wherein the telecommunications system is a telecommunications system based on a CDMA multiple-access methods.

82. The transceiver as claimed in claim 81, wherein the telecommunications system is a JD-CDMA telecommunications system.

83. The transceiver as claimed in claim 80, wherein the transceiver comprises at least one of a base station and a mobile station.

84. The transceiver as claimed in 80, wherein an opposing station comprises at least one of a mobile station and a base station.

85. The transceiver as claimed in claim 80, wherein the transceiver is a base station, and an opposing station is a mobile station.

* * * * *